UNITED STATES PATENT OFFICE.

ALFRED PHILIPS, OF HÖCHST-ON-THE-MAIN, GERMANY, ASSIGNOR TO THE FARBWERKE, VORMALS MEISTER, LUCIUS & BRÜNING, OF SAME PLACE.

PROCESS OF DYEING.

SPECIFICATION forming part of Letters Patent No. 632,503, dated September 5, 1899.

Application filed February 5, 1898. Serial No. 669,239. (No specimens.)

*To all whom it may concern:*

Be it known that I, ALFRED PHILIPS, Ph.D., a subject of the Queen of Holland, residing at Höchst-on-the-Main, Germany, have invented certain new and useful improvements in the production of fast brown to brown-black tints on the fiber by combining naphthol with the diazo compounds of diamidocarbazols, of which the following is a specification.

This invention relates to the production of fast brown to brown-black tints on the fiber by combining beta-naphthol with the diazo compounds of diamidocarbazols.

In cotton printing and dyeing diazo compounds of benzidin and tolidin, combined with beta-naphthol, are much used for producing brown colors on the fiber. The colors thus obtained are of a beautiful reddish-brown tint and fast to soap. Their fastness to light, however, is defective and cannot even be improved by treating the dyestuffs produced on the fiber with copper salts. I have succeeded in producing with beta-naphthol a brown very fast to light by combining the beta-naphthol with the diazo compounds of the diamidocarbazols. The diazo compounds are either used in a pure state, whereby a brown to brown-black relatively fast to light is obtained, or an appropriate copper salt is added, thus increasing the fastness to light of the dyestuffs produced. Of the brown dyestuffs fast to light the one obtained with the meta compound has, moreover, the advantage over the benzidin or tolidin dyestuffs, that it has a yellowish tint, which is mostly preferred to the reddish one. The para compound yields a very powerful valuable brown-black.

The manufacturer of the brown from diamidocarbazols is carried out in the usual manner.

Example I.

*Diazo solution.*—Twenty grams diamidocarbazol are dissolved in twenty cubic centimeters of hydrochloric acid of 22° Baumé and one hundred cubic centimeters of hot water. The solution is then cooled. Two hundred grams of ice are added, then thirty cubic centimeters of hydrochloric acid of 22° Baumé are stirred in, to which fifty-two cubic centimeters of solution of nitrite (two hundred and ninety grams per liter) are added, filtered, and made up to five hundred cubic centimeters.

*Copper solution.*—One hundred and sixty grams of crystallized copper chlorid, forty-two and six-tenths grams of crystallized copper acetate, eighty grams of crystallized sodium nitrite, and sixty-six cubic centimeters of acetic acid of 8° Baumé are dissolved in one liter water.

*Printing-color I.*—Five hundred grams of tragacanth water, 60:1000; five hundred cubic centimeters of diazo solution, fifty grams of crystallized acetate of sodium, four hundred grams of tragacanth water, 60:1000; five hundred cubic centimeters of diazo solution, one hundred cubic centimeters of copper solution, fifty grams of crystallized sodium acetate.

*Naphthol grounding.*—Thirty grams of beta-naphthol, fifty cubic centimeters of caustic soda-lye of 22° Baumé, thirty grams crystallized ricinoleate of soda, one liter.

The printing-color I and II is printed on the fabric prepared with the naphthol grounding and the fabric is then washed.

Example II.

The naphthol-grounded fabric is passed through the diazo solution of diamidocarbazol, either mixed with copper salts or without, and then is washed.

Having now described my invention, what I claim is—

The herein-described process of producing brown to brown-black colors on the fiber, which consists in treating the naphthol-grounded fabric with the tetrazo solutions of the diamidocarbazols, substantially as described.

In testimony that I claim the foregoing as my invention I have signed my name in presence of two subscribing witnesses.

ALFRED PHILIPS.

Witnesses:
HEINRICH HAHN,
ALFRED BRISBOIS.